May 27, 1969  B. K. HUANG ET AL  3,446,164
AUTOMATIC TRANSPLANTER

Filed Feb. 20, 1967

BARNEY K. HUANG
WILLIAM E. SPLINTER
INVENTORS

BY *[signature]*

ATTORNEY

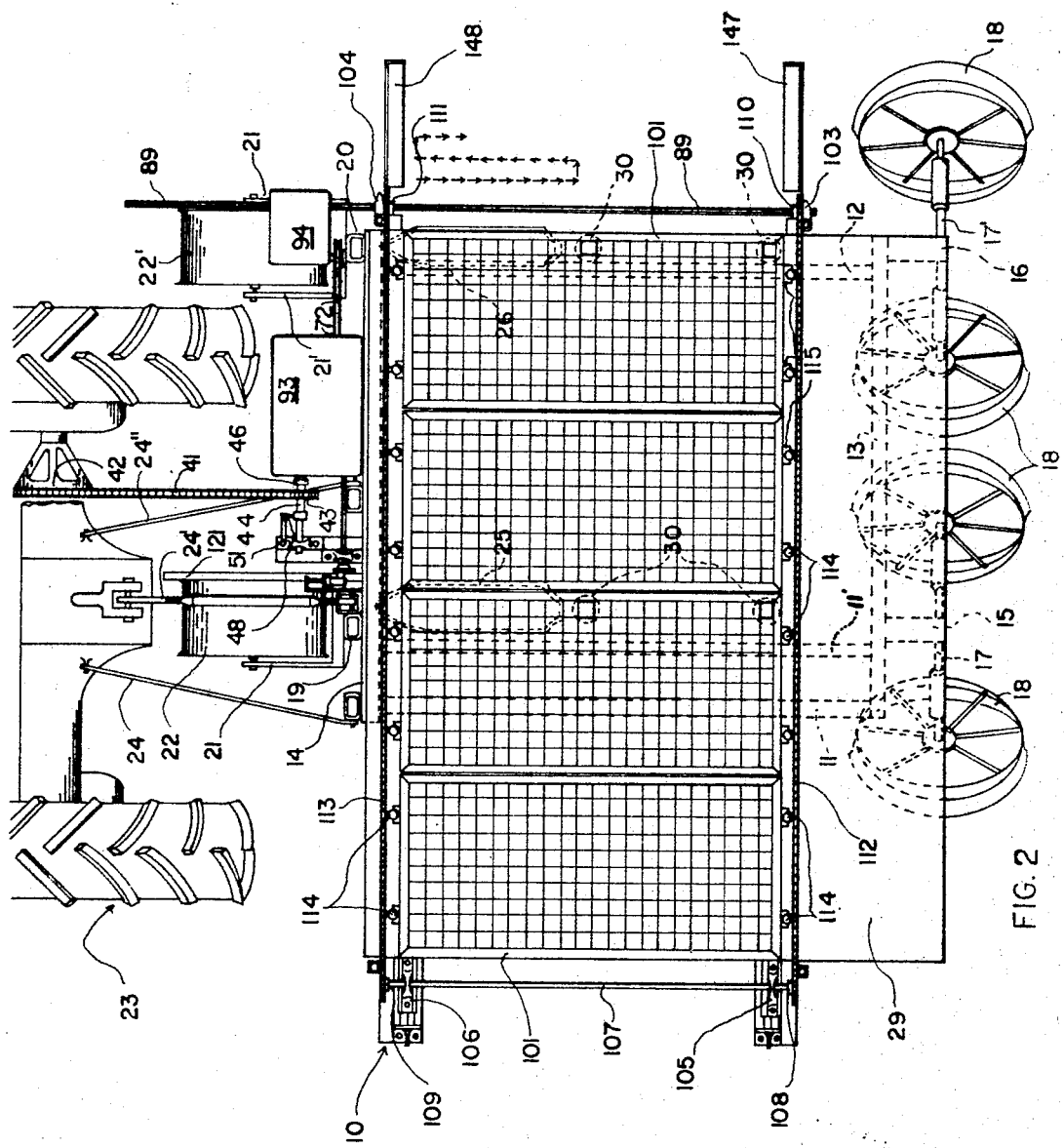

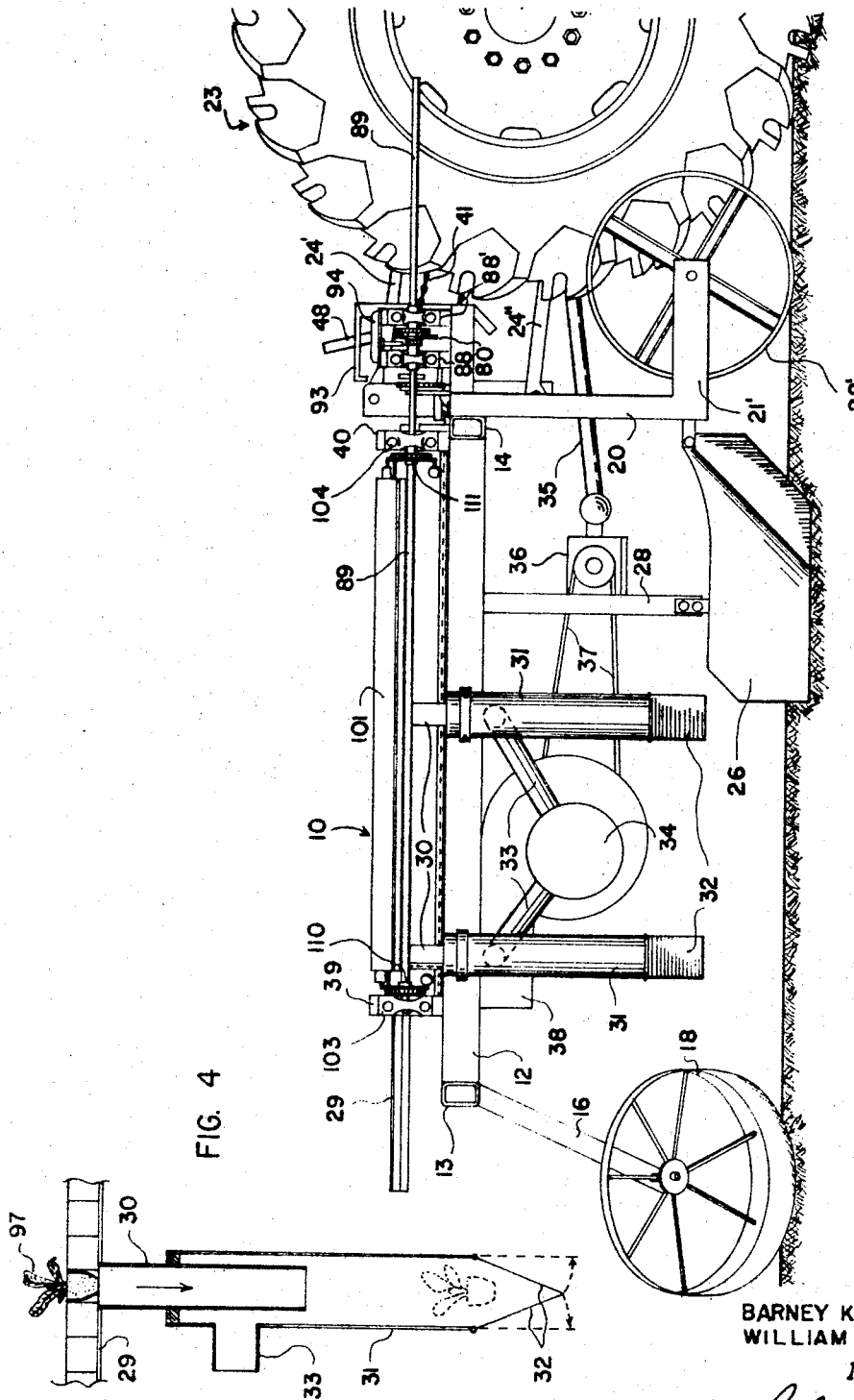

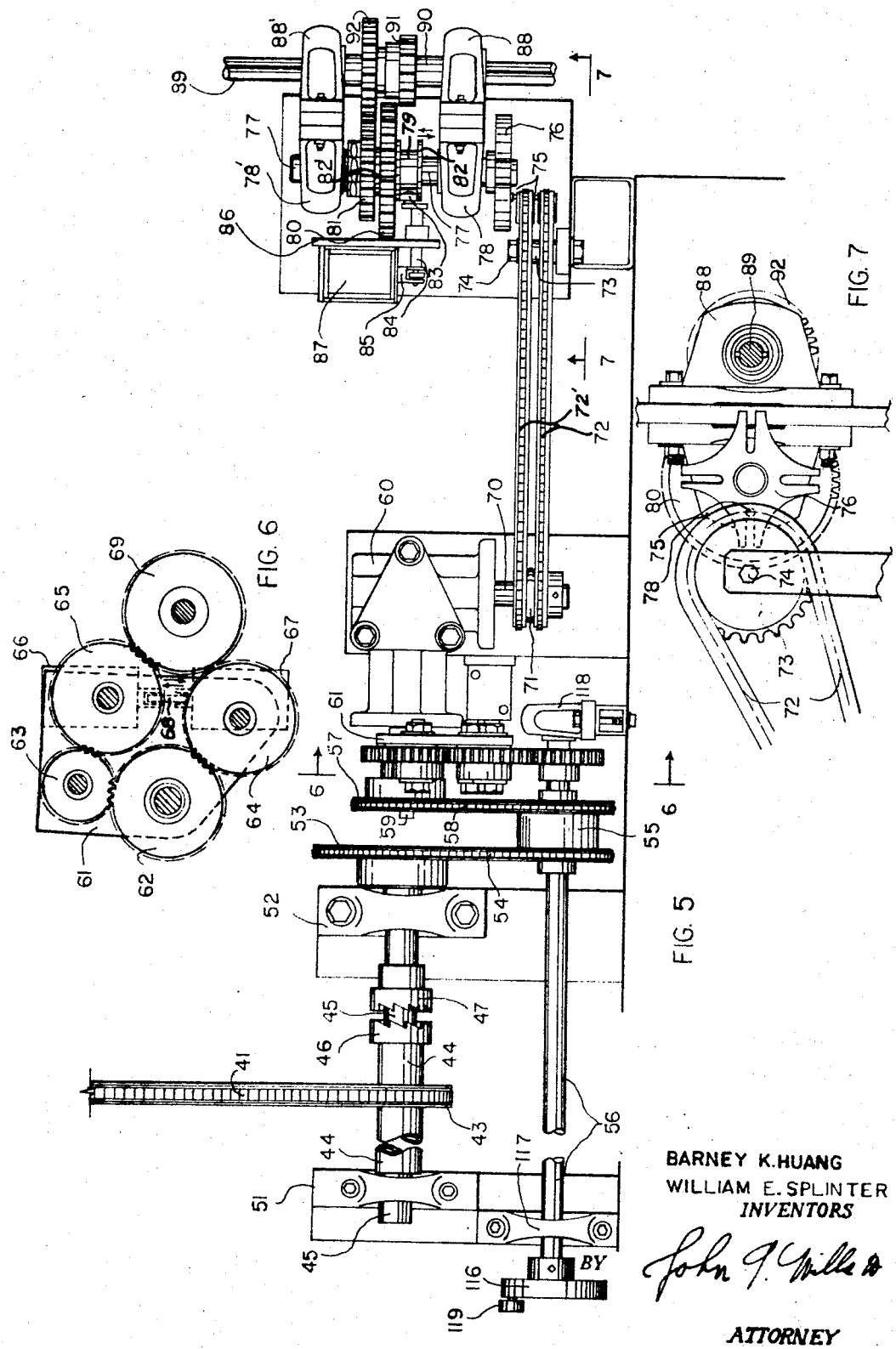

BARNEY K. HUANG
WILLIAM E. SPLINTER
INVENTORS

BY John J. Miller

ATTORNEY

United States Patent Office 3,446,164
Patented May 27, 1969

3,446,164
AUTOMATIC TRANSPLANTER
Barney K. Huang, 5108 Kaplan Drive 27606, and
William E. Splinter, 31 Shepherd St. 27607, both
of Raleigh, N.C.
Filed Feb. 20, 1967, Ser. No. 621,722
Int. Cl. A01c 11/02; G07f 11/48
U.S. Cl. 111—3                                    17 Claims

ABSTRACT OF THE DISCLOSURE

In abstract, a preferred embodiment of the present invention is a fully automatic, impact type, transplanter for field planting of potted plants through the use of a wheel driven electromechanical programming system.

---

This invention relates to agricultural implements and more particularly to automatic transplanting devices of the type for transplanting from nursery beds to the fields of tobacco, rice, celery, cabbage, tomato, pineapple and similar types of row crops.

In the past, various types of transplanting devices have been developed with greater or lesser automatic operation. All of these devices, however, have required at least one operator riding on the transplanting unit to feed the young plants from the nursery beds into various types of plant conveyors or directly into an open furrow. Due to the relative sturdiness of certain types of plants, such as young pineapple plants, semiautomatic planting devices have been found to work relatively well. With certain other types of plants such as tomato plants, tobacco plants and rice plants, automation has not been successfully applied due to their fragility and because of entanglement of the plants during handling, thereby injuring them. At the present time, the majority of transplanting for these crops, as well as other crops such as celery and cabbage, is still primarily done by hand. This is a very expensive operation not only from the standpoint of high labor cost in a short period of time but also in the fact that many plants will be injured or inaccurately planted due to human error to such a point that they will not survive. These missing plants must be reset thereby requiring even more labor. Further, unavoidable human error results in ununiform stands which at best adversely effects mechanical harvesting if not actually precluding it.

After extensive research into the above indicated problems and into their possible solutions, applicants have developed a fully automatic, electromechanically programmed, transplanting device which places potted type plants at predetermined intervals in a field with close to 100 percent survival rate and which completely eliminates human error in operation by requiring only a driver for the tractor unit.

Not only does applicants' device automatically plant nursery type plants at predetermined intervals but it also has programming means to control the reservoirs or cartridges which makes the automatic planting possible. Additionally the entire unit is simple in construction and operation while at the same time doing a job much superior to similar prior art devices.

It is, therefore, an object of the present invention to provide a fully automatic, mechanically operated, transplanting device so constructed as to effect close to 100 percent survival of the plants used in the operation.

Another object of the present invention is to provide a completely automatic, gravity type, transplanting device having supplemental means for regulating the velocity of impact between a plant and earth thereby allowing uniform control of the final growth position of the plants as well as assuring close contact between the soils of the plants and the field.

Another object of the present invention is to provide a planting implement adapted to automatically set at spaced predetermined intervals, either in bare roots or soil cube form, plants initially grown in nursery type beds.

A further object of the present invention is to provide an automatic transplanting device adapted to plant a multiplicity of plants at each increment of an automatic, mechanically programmed, control unit.

Another object of the present invention is to provide a programming unit used in conjunction with a transplanting device which automatically and systematically empties cartridge type trays holding growing plants as well as automatically moves from one tray to another without adjustment or delays in the planting operation.

Another object of the present invention is to provide a grid type tray which is mechanically actuated in a preselected program to systematically empty each opening in the said grid.

An additional object of the present invention is to provide an automatic transplanting device having a plant reservoir so constructed that it can either be loaded just prior to the transplanting operation or the plants can be grown from seeds in said reservoir and operatively connected to the transplanter just prior to the transplanting operation.

Another object of the present invention is to provide means for loading a multiplicity of tray type cartridges in operative relation to an automatic transplanting device to allow extended operation of such device without the necessity of reloading each cartridge as it is emptied.

Other objects and advantages of the present invention will become apparent and obvious from a study of the following description and the accompanying drawings which are merely illustrative of the present invention.

In the drawings:

FIG. 2 is a top plan view of such invention;

FIG. 3 is a side elevational view of the same;

FIG. 4 is a diagrammatic sectional view of one of the drop tubes in operative relation to the other parts of the device;

FIG. 5 is a top plan view of the power train through the electromechanical programming system of the present invention;

FIG. 6 is a section through lines 6—6 of FIG. 5;

FIG. 7 is a view taken from lines 7—7 of FIG. 5;

Figure 1:
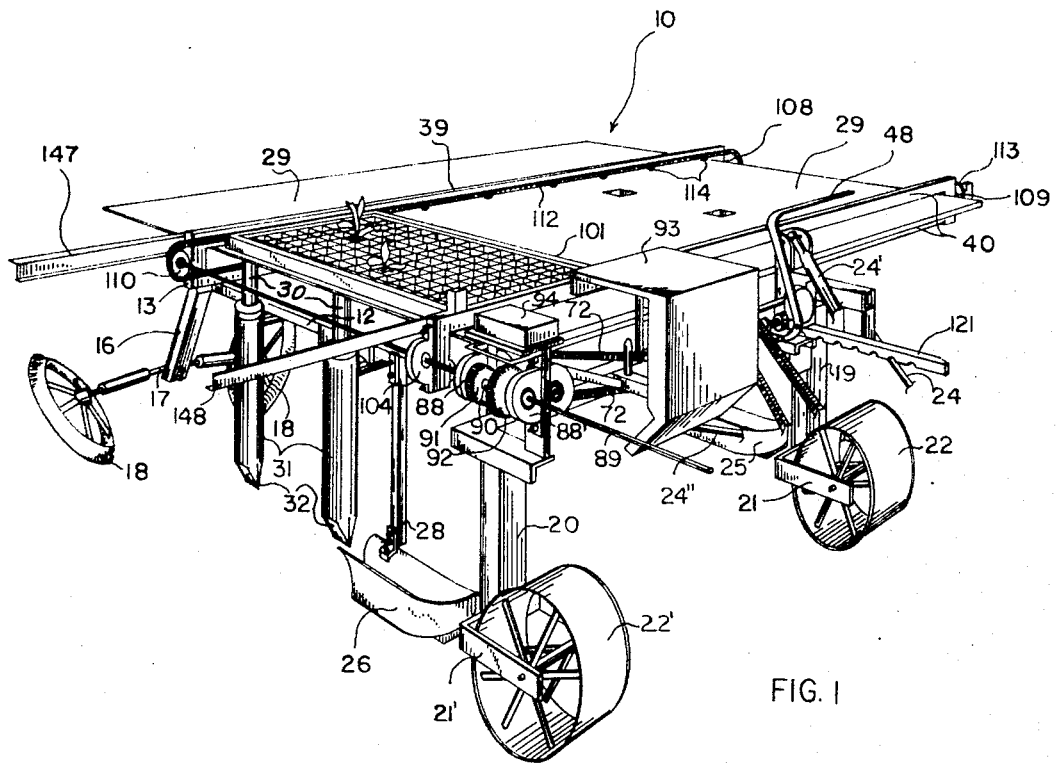
FIG. 1 is a perspective of a preferred embodiment of the automatic transplanting device of the present invention.
Figure 8:
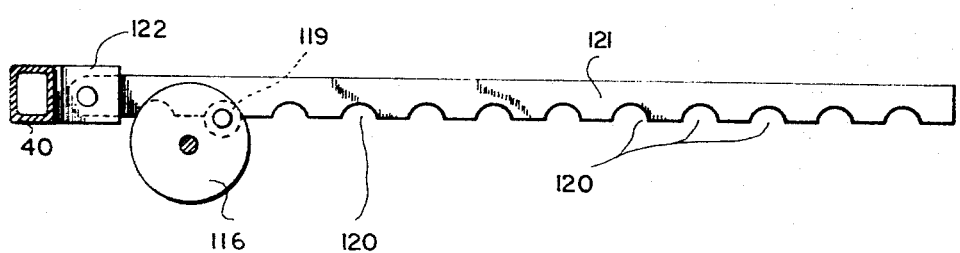
FIG. 8 is an enlarged side elevation of the grid control rack and pinion.

With further reference to the drawings, a transplanting device indicated generally at 10 has a main frame composed of a pair of longitudinal members 11 and 12 which are fixedly secured to a pair of lateral members 13 and 14. Secured to the bottom portion of lateral member 13 are two downwardly and rearwardly projecting rear support members 15 and 16. Each of these support members carries an axle 17 and 17'. On each end of each of these two axles are mounted press wheels 18 which slope inwardly toward each other at an angle of approximately 45 degrees.

Fixedly secured to the forward portion of lateral member 14 are a pair of downwardly projecting support members 19 and 20. To the bottom portion of each of these members are secured forwardly projecting yokes and rotatively mounted depth control wheels 22 and 22'.

Although it is obvious tha tthe present invention could be either self-propelled or propelled by some other means, a tractor indicated generally at 23 is shown for illustration purposes. A three-point type hitch which is commonly used for operatively connecting implements to tractors has been used as shown at 24, 24' and 24".

Adjustably mounted rearwardly of the lower portions of forward support members 19 and 20 are openers 25 and 26. Each of these openers are held in proper horizontal alignment by adjustable support members 28 which downwardly project from longitudinal members 11' and 12.

Fixedly mounted in spaced relation above the main transplanter frame formed by longitudinal members 11 and 12 and lateral members 13 and 14 is a grid tray bearing plate 29. Spacer members may be provided at desirable intervals to rigidly unite bearing plate 29 to the transplanter frame as hereinabove described.

Openings are provided at spaced predetermined intervals in the bearing plate which communicate with drop tubes 30. Each of these drop tubes has a vacuum sleeve 31 surrounding the lower portion of such tube. The lower portion of each of the vacuum sleeves is provided with a pair of swingably mounted drop doors 32. Communicatively connected to the upper portion of each of the vacuum sleeves above the bottom of the drop tube 30 are vacuum hoses 33 which operatively communicate with vacuum producing blower 34. If the transplanter of the present invention is used in conjunction with a tractor unit, the conventional power take-off of such unit may be used to drive shaft 35 which transmits, by way of right angle gear box 36 and belt drive 37, rotative power to vacuum blower 34. In producing a vacuum through the drop tube system, air is exhausted rearwardly from the housing extension 38 of blower 34.

A pair of parallelly disposed slotted frame members 39 and 40 are secured in fixed spaced relation to each other and are adapted to accommodate tray bearing plate 29 within said slot in such a manner that said laterally disposed frame members can easily slide longitudinally fore and aft relative to said bearing plate. Frame member 39 is preferably disposed rearwardly of the rearward most drop tube 30 while frame 40 is disposed forward of the forwardmost tube. In the present embodiment, the distance between the slotted frames 39 and 40 is approximately double the distance between the longitudinally aligned drop tubes.

When the device of the present invention is placed in actual operation, power is obtained directly from the right rear wheel of the tractor unit 23 and transmitted to the transplanting device 10 by way of chain drive 41 which transmits power from sprocket 42 to sprocket 43. Sprocket 43 is fixedly secured to sleeve 44 which is slideably mounted on shaft 45. One side 46 of a toothed clutch is fixedly secured to sleeve 44 while the other side 47 is fixedly secured to shaft 45. Engagement and disengagement of the clutch parts 46 and 47 may be accomplished by any convenient means such as a pivoted handle 48 which slides sleeve 44 on shaft 45 to accomplish engagement and disengagement.

Shaft 45 is rotatively mounted between bearings 51 and 52. A third sprocket 53 is fixedly mounted on one end of shaft 45. A second chain drive 54 operatively connects third sprocket 53 with double sprocket 55 which is rotatively mounted on pinion shaft 56. The second sprocket of double sprocket 55 is operatively connected to fourth sprocket 57 by third chain drive 58.

Sprocket 57 is fixedly secured to the input shaft 59 of right angle gear drive 60. A gear plate 61 is pivotably mounted on shaft 59 between sprocket 57 and gear drive 60. Juxtaposed to plate 61 between it and sprocket 57 is gear 62 which is fixedly mounted on shaft 59.

Gears 63 and 64 are rotatively mounted on gear plate 61 and are in constant mesh with gear 62. Gear 65 is rotatively mounted on gear plate 61 and is in constant mesh with gear 63. Gears 64 and 65 have the same number of teeth and are of the same diameter thereby causing them to rotate at the same speed but in opposite directions.

Solenoids 66 and 67 are mounted in opposing positions on the frame of the transplanter with their operating shafts in operative engagement with outwardly projecting flange 68 which is fixedly secured to gear plate 61 on the side opposite gears 63, 64 and 65. Gear 69, which is fixedly secured to pinion shaft 56, is located adjacent gears 64 and 65. When solenoid 66 is activated, it presses against flange 68 thereby pivoting gear plate 61 to mesh gears 65 and 69. When solenoids 67 is activated, pressure is placed against flange 68 in an opposite direction thereby pivoting gear plate 61 to mesh gears 64 and 69 thereby allowing pinion shaft 56 to be rotated in the opposite direction from when solenoid 66 is operative. The switches (not shown) for activating these solenoids are such that only one can be operational at the time.

Output shaft 70 of right angle gear drive 60 has fixedly mounted thereon double sprocket 71. Double roller chains 72 and 72' transmit power from double sprocket 71 to double sprocket 73 which is rotatively mounted on shaft 74. Chains 72 and 72' are linked together by means of a pin 75 which extends outwardly on one side of said chains. A Geneva wheel 76 is so mounted adjacent chains 72 that it will be rotated 90 degrees on each engagement with pin 75. Shaft 77 is rotatively mounted in bearings 78 and 78' and slotted Geneva wheel 76 is fixedly secured to one end of such shaft as it projects beyond bearing 78. The portion of shaft 77 between bearings 78 and 78' is either slotted or flattened to allow shifting sleeve 79 to be slideably mounted thereon in relatively fixed rotative position. Gears 80 and 81 are fixedly mounted on shifting sleeve 79 as are outwardly projecting flanges 82 and 82'. These flanges form a groove around shifting sleeve 79 in which slide 83 is adapted to be operatively placed. Connecting rod 84 is fixedly secured to slide 83 at one end and to the arm 85 of solenoid 87 at the other end. A fixed bracket 86 is provided which engages rod 84 in its center portion thereby allowing sleeve 79 to be shifted by push-pull solenoid 87.

Slideably and rotatively mounted through bearings 88 and 88' is key-way shaft 89. Sleeve 90 is keyed into and slideably mounted on key-way shaft 89 between bearings 88 and 88'. Gears 91 and 92 are fixedly mounted in spaced relation to each other on sleeve 90. Through shifting of sleeve 79, gears 81 and 92 can be meshed for relatively slow rotation of shaft 89 while allowing relatively fast rotation of such shaft when solenoid 87 is shifted to mesh gears 80 and 91 due to the relative largeness of gear 80 compared to gear 81 and the relative smallness of gear 91 compared to gear 92.

A housing 93 is provided to protect the power train between the clutch 47 and roller chains 72. A second housing 94 is provided to protect the power train which rotates key-way shaft 89.

On each end of slotted frame members 39 and 40 are bearing housings 103, 104, 105 and 106. Key-way shaft 89 is rotatively mounted through bearings 103 and 104 while shaft 107 is rotatively mounted through bearings 105 and 106. Sprockets 108 and 109 are fixedly secured on the ends of shaft 107 outboard of bearings 105 and 106 respectively. Just inboard of bearings 103 and 104 are sprockets 110 and 111 respectively which are fixedly secured to key-way shaft 89. A grid tray conveyor chain 112 is operatively connected between sprockets 108 and 110 and a second grid conveyor chain 113 operatively connects sprockets 109 and 111. Thus it can be seen that chains 112 and 113 move together in the direction shaft 89 is rotated. It is also noted that since the four sprockets carrying these chains are mounted at the ends of slotted frames 39 and 40, the top of each chain passes over the grid tray bearing plate 29 while the lower portion of the chain passes under such plate. At spaced intervals along each chain are inwardly projecting bulbous portions 114. These bulbous portions are adapted to connectively engage outwardly projecting, slotted, concaved projection 115 on the ends of each of the gride frames 101.

Although the potted plants can be grown in frames 101 and then placed in operative position on the transplanting unit as disclosed in FIG. 1, the preferred method appears to be place empty grid frames 101 in operative relationship to grid conveyor chains 112 and 113 on grid tray bearing plate 29 particularly as disclosed in FIG. 2. Next, a growing frame 98 is placed over and in line with the empty grid frame 101. Then the bottom 100 is removed from the full frame 98 thereby allowing the plants therein to fall into the grid openings 102 of frame 101. Frame 98 is then removed and the transplanting device is ready for operation.

While the tractor unit 23 is moving the transplanter 10 to the field and aligining it to commence the planting operation, sprocket 42, which is connected directly to the right wheel of the tractor 23, transmits rotative power to sleeve 44 by way of chain 41 and sprocket 43. The clutch teeth 46 are disengaged from teeth 47 thereby making the transplanter inoperative. When the planting operation is ready to commence, the tractor operator activates clutch engaging handle 48 to engage teeth 46 and 47 of clutch. As the tractor begins to roll, power is transmitted from the right rear wheel of the tractor through sprocket 42, chain 41, sprocket 43 and sleeve 44 to shaft 45. In turn, sprocket 53 operates double sprocket 55 through chain drive 54. The second half of sprocket 55 drives sprocket 57 through chain drive 58. Sprocket 57 is fixedly secured to and therefore drives shaft 59 which in turn drives right angle gear drive 60 as well as gear 62. Due to the constant mesh position, gear 62 drives gear 65 through gear 63 in one direction and gear 67 in the opposite direction.

A pair of microswitches, one located at the forwardmost extremity of travel of the grid frame and the other located at the rearwardmost extremity of travel of the grid frame, determine whether solenoid 66 or solenoid 67 is activated. Assuming for illustrative purposes that solenoid 66 is activated, then gear 65 will mesh with gear 69 thereby imparting rotative motion through shaft 56 to pinion plate 116 which is fixedly secured to the end thereof beyond bearing 117 at the opposite end of said shaft from bearing 118. Pinion roller 119 engages progressively each of the multiplicity of slots 120 in the longitudinal indexing rack 121. This rack is secured to the lower portion of slotted frame 40 by means of mounting bracket 122 which causes said frame to move thereby moving the grid frame 101 the distance between the slots 120 of rack 121 for each revolution of pinion plate 116. When shaft 56 has turned pinion plate 116 the same number of revolutions as openings 120 in rack 121, the microswitch (not shown) at the extreme limit of travel of frame 101 is tripped thereby activating solenoid 67 to disengage gear 65 from gear 69 and to engage gear 64 with 69. This reverses the direction of rotation of gear 69 thereby reversing the rotation of shaft 56 and pinion plate 116. Each time pinion plate 116 make a revolution, grid tray 101 moves a distance equal to one grid width thereby placing two grid openings of each grid frame over a pair of longitudinally aligned drop tubes 30. The vacuum blower 34 which is operated from the power take-off of tractor 23 creates a vacuum within vacuum sleeve 31 which, due to the doors 32 being closed and the top of drop tube 30 being open, accelerates the fall of the plant through the drop tube. As the plant reaches the lower portion of the vacuum sleeve, it strikes doors 32 which open thereby allowing plant to pass therethrough and to impact the earth at a predetermined velocity which may be controlled by increasing or decreasing the vacuum of vacuum blower 34.

Roller chains 72 are of a predetermined length which gives them one complete travel cycle for the movement of pinion roller 119 from the first to the last slot 120 of rack 121. Just as pinion wheel 119 reaches the last slot which trips the microswitch to reverse the rotation of pinion plate 116, pin 75 engages the slotted Geneva wheel 76 to rotate the same 90 degrees. This rotation has been predetermined to take place during the time pinion roller 119 leaves engagement with the last slot 120 in rack 121 until it reverses and engages the first slot on the return cycle. The timing of the movement of the Geneva wheel 90 degrees to coincide with the reversing movement of the pinion plate produces no longitudinal travel in the grid frame 101 and thereby prevents multi-directional movement of the grid frame which would, if it occurred, cause the transplanter to skip one grid opening from passing over the drop tubes.

The movement of the Geneva wheel 90 degrees rotates shaft 77 which in turn rotates gear 81. In turn, gear 92 which is meshed with gear 81 rotates slotted shaft 89 which, due to the predetermined ratio of gears 81 and 92, has the effect of moving the grid frame 101 laterally a distance equal to the width of a single grid opening. This cycle is repeated until the Geneva wheel has been engaged the same number of times as there are grid openings across grid frame 101. Since grid frame 101 is half as wide as the grid openings 102, the grid frame must move an additional grid opening width in a lateral direction in order to begin emptying the next grid frame. To accomplish this, a microswitch (not shown) has been positioned in a convenient location to activate push-pull solenoid 87 so that when the last plants in a grid frame are dropped through drop tubes 30, the solenoid will shift sleeve 79 thereby disengaging gear 81 from gear 92 and engaging gear 80 with gear 91. Due to the difference in the ratio of these two sets of gears, shaft 89 will rotate twice as far in this latter gear position than in the former. Thus it can be seen that the lateral movement of frame 101 is doubled thereby skipping the width of one grid opening which in essence places the first row of openings in the second grid frame in operative position over the drop tubes 30.

To give the device of the present invention more utility, a grid tray stacking device may be provided which greatly incrases the distance the transplanter can operate before it requires reloading. One manner in which the stacked trays may be loaded is disclosed in FIG. 9 wherein a pair of vertically disposed V-beams 123 and 124 are fixedly attached to lateral cross member 14 of the main frame to transplanter 10.

Since each of the grid trays stacked must have a bottom 125 to prevent the plants therein from falling through the grid, an opening is made in the grid tray bearing plate 29 a size just greater than said bottom. Through actual use it has been found that a small downwardly and outwardly projecting lip on each of the tray bottoms will allow them to be stacked as additional grid trays are moved into the operative transplanting position. Releasable latches 126 are provided between each of the grid tray frames 101 and their bottoms 125. Although there are numerous types of latches which will adequately serve this purpose, the Hartwell Latch H408, which is commercially available, has been found satisfactory for this purpose since they will automatically unlatch when the tray is dropped onto the opening in bearing plate 29.

Projecting upwardly to just below the plane cut by the top of bearing plate 29 is a compression mechanism (not shown) of standard construction such as a spring biased device which allows the top surface of the bottom plate of each of the grid frames to be flush with the top surface of bearing plate 29 during the emptying of that grid tray frame in the transplanting process.

The stacking of a series of trays is done by providing two box beams 127 and 128 which are adapted to ride up and down V-beams 123 and 124 respectively. To effect this rolling motion, yoke frames 129 and 130 are fixedly secured to the upper portions of box beams 127 and 128 respectively. Axles 131 and 132 are so mounted that wheels 133 and 134 roll on the opposite side of V-beams 123 and 124 from box beams 127 and 128. Wheels 135 and 136, each being concave in radial cross section, are rotatively mounted on the lower portions of box beams 127 and 128 and are adapted to roll in engagement with V-beams 123 and 124 respectively.

Tray frame 101 may be releasably connected to box beams 127 and 128 by any convenient means. One manner of accomplishing this would be to provide the end portions of each of the grid frames 101 with projections having bulbous portions on the end thereof which engage slots in box beams 127 and 128 thereby releasably connecting the two units.

To progressively move each of the trays to operating position, centrally pivoted handle 137 is provided which is located within easy reach of the driver (not shown) of the tractor 23. When this handle is moved in either lateral direction, it moves connecting rod 138 laterally in the opposite direction. Pins 140 and 141 are fixedly secured perpendicular to rod 138. These pins pivotably engage the bottom portion of latches 142 and 143. The center portion of each of these latches is pivoted from brackets 144 and 145 which are fixedly secured to beams 123 and 124 respectively. Each of the latches 142 and 143 has an outwardly projecting lip on its upper portion and a second outwardly projecting lip on its lower portion. On the side of each box beam is a series of outwardly projecting stops 146 which are in horizontal alignment with every second grid frame.

Figure 9:
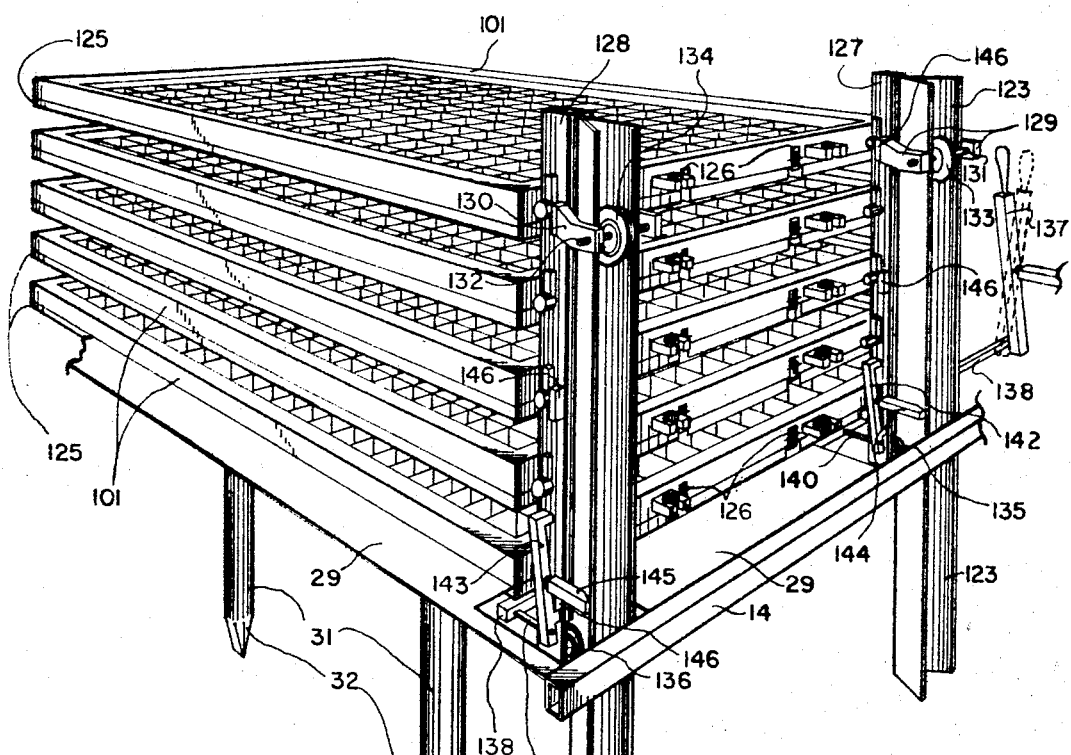
FIG. 9 is a perspective of a multiple tray carrying unit adapted to feed filled grid trays into the transplanting system of the present invention.
Figure 10:
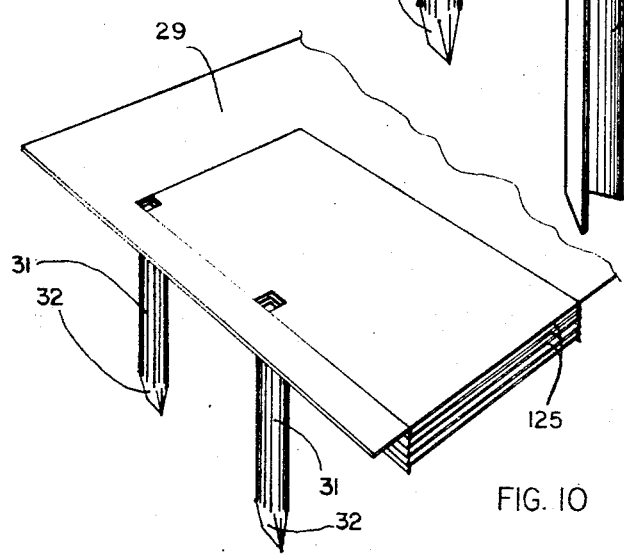
FIG. 10 is a perspective of several nested grid tray bottoms in operative relation to the grid tray bearing surface.
Figure 11:
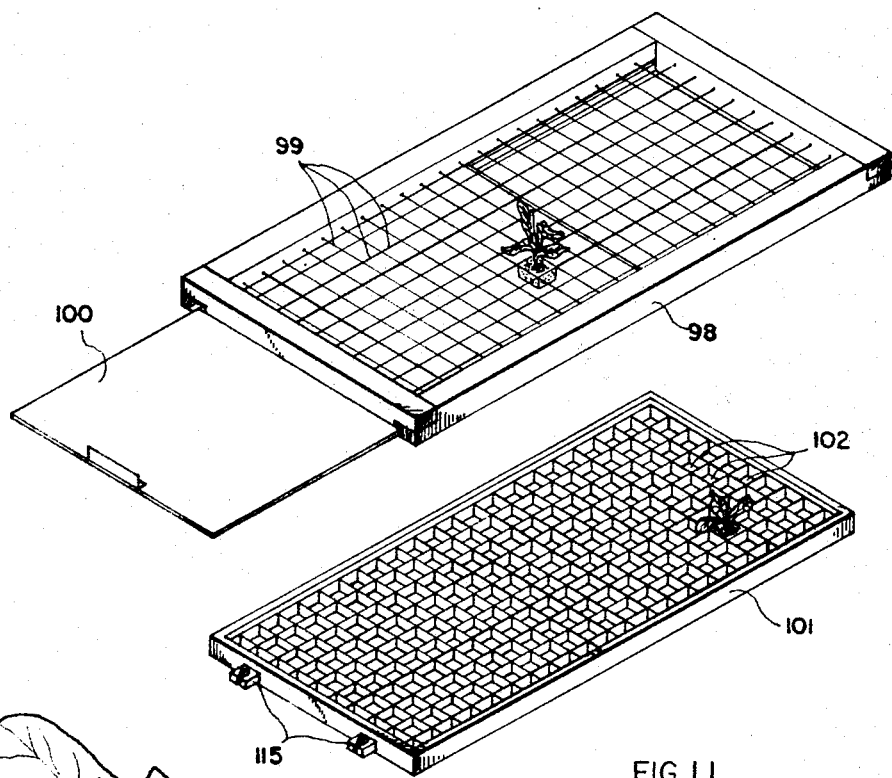
FIG. 11 is an exploded perspective of a growing rack in relation to its loading position above the transplanter grid.
Figure 12:
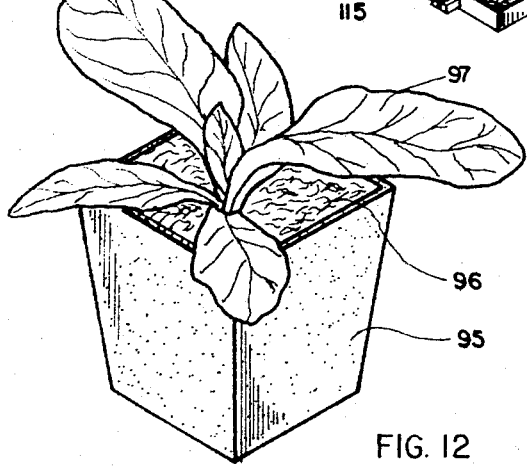
FIG. 12 is a perspective of a potted plant of the type that can be used in conjunction with the present invention.

When handle 137 is activated from a position shown in FIG. 9 to the position shown in dotted outline, rod 138 will move thereby disengaging, through the action of pin 141, the bottom lip of latches 142 and 143 from stops 146 of beams 127 and 128. At the same time the upper lip of latches 142 and 143 will engage the next stop on each of the two box beams thereby allowing such beams to drop a distance equivalent to the distance between the first and second grid frames.

When handle 37 is operated in the opposite direction from that just described, the stops will disengage from the upper lip of the latches while stops will engage the lower lip thereof thus allowing another drop of a distance equal to the space between frames. This procedure can be repeated until all of the trays have been emptied. After each tray is emptied, it will of course be removed prior to the dropping of the next one.

In using either the grid frame arrangement disclosed in FIG. 2 or the stack loader of FIG. 9, when the frames are empty they may be pushed off the end of the grid tray bearing plate 29 and may be caught by any convenient structure such as the two retaining supports 147 and 148 particularly as disclosed in FIGS. 1 and 2.

In an overall farming operation using the disclosure of the present invention, soil cubes or disintegrable containers 95 such as paper pots, peat pots or the like are placed between the grid wires 99 of frame 98 and filled with earth 96. Seeds are then planted and plants 97 allowed to mature to transplanting age. The plants are then transferred to the grid openings in grid frame 101 by placing frames 98 and 101 in vertical alignment and slideably removing bottom 100. If the stacked-type cartridge grids are used, the plants may be placed in the grids and the grids moved to the transplanter. If the stacked cartridges are not used, frame 98 may be transported to the transplanter where the grid frames are loaded after they are placed in operative position on grid tray bearing plate 29.

Once the grid frames 101 are loaded, handle 48 is moved to engage the clutch mechanism to connect power from the rear wheel of the tractor to the indexing mechanisms. As the tractor moves forward, the indexing mechanisms of the transplanter are operated at the same relative speed as the tractor thereby always allowing uniform predetermined spacing of the plants as they move over the openings in the bearing plate 29 which communicate with the drop tubes 30. As the transplanter moves through the fields, the openers 25 and 26 make a furrow of predetermined depth according to the relative setting between the depth control wheels 22 and 22' and said openers. As the transplanter moves along, the indexing mechanisms operate as hereinabove described to automatically control the longitudinal and lateral movements of the grid trays so that in turn each plant in each tray will move over the drop tubes 30 and pass therethrough and, with the assistance of the vacuum system heretofore described, into the open furrow. As each plant is placed in the furrow, press wheels 18 pass on either side pushing the dirt up around the plant thereby insuring its survival and continued growth. Once the grid trays on the transplanter are empty, the device must be stopped and the grid cartridges reloaded. Once this is accomplished the transplanting operation can be continued for another cycle.

It is obvious that the present invention has the advantages of accomplishing the transplanting of plants much faster and with a much greater rate of survival than has hereinbefore been possible while at the same time reducing the labor cost involved to the very minimum. Due to the completely automatic operation of the transplanter, in combination with the improved method of raising the young plants to the stage of transplanting, mature crops of uniformed size and quality can be grown. With the increasing mechanization of the farming operation, uniform size and quality are becoming ever increasingly important, particularly in the areas in which mechanical harvesting is being or has been developed.

The terms "upper," "lower," "top," "bottom" and so forth have been used herein merely for convenience in the foregoing specification to describe the automatic transplanter and its parts as oriented in the drawings. It is to be understood, however, that these terms are in no way limiting to the invention since the transplanter may obviously be disclosed in many different positions when in actual operation.

The present invention may, of course, be carried out in other specific ways than those herein set forth without departing from the spirit and the essential characteristics of the invention. The present embodiments are, therefore, to be considered in all respects as illustrative and not restrictive and all changes coming within the meaning and equivalency range of the appended claims are intended to be embraced therein.

What is claimed is:

1. In a transplanting device of a type which includes means for propelling the device over the ground, means for opening a furrow in the ground beneath the device, and means for moving a plant into planting position above a vertically disposed drop tube, the improvement comprising: an enlarged vertically disposed vacuum sleeve mounted about the lower portion of said tube and extending below the lower end thereof; a generally air tight relatively fixed closure means mounted between the upper end of said sleeve and the exterior portion of said tube adjacent said upper end; a flexible generally air tight closure means mounted on the lower end of said sleeve; a suction hose means mounted in the side of said sleeve intermediate its upper end and a point adjacent the lower end of said tube; and means for applying a vacuum to said hose whereby the rate of drop of a plant falling through said tube is increased.

2. The device of claim 1 including means to regulate said vacuum means thereby regulating the rate of fall of said plant.

3. In a transplanting device which includes a propelling means for moving the device over the ground, means for opening a furrow in the ground beneath the device, and enlarged horizontally disposed bearing plate means mounted on said device in such a manner that a multiplicity of longitudinally aligned openings therein are in vertical alignment with said ground openings, and a rectangular grid frame adapted to separate a multiplicity of plants supported by said plate, the improvement comprising: mechanical means for alternately moving said frame longitudinally forward and rearwardly a distance equal to the interior longitudinal length of said frame; mechanical means for laterally shifting in one direction said frame distance equal to the width of one grid opening; means for activating said shifting means whenever said moving means reaches its limit of travel; and means for activating said shifting means a distance equal to the width of two grid openings whenever said shifting means has been activated a number of times equal to the lateral interior width of said frame whereby plants in a multiplicity of grid frames may be planted prior to the reloading of such frames.

4. The device of claim 3 wherein mechanical means are provided for removing each frame when it is empty and means for replacing it with a loaded frame.

5. The device of claim 4 wherein the replacing means is a series of stacked frames with means for selectively and progressively lowering each frame into operating position of said plate.

6. In a transplanting device of the type which includes means for propelling the device over the ground, means for opening a furrow in the ground beneath the device and means for shifting a plant separating grid frame over a series of drop openings in a horizontally disposed bearing plate thereby dropping said plants into said furrow, the improvement comprising: at least one vertically disposed frame support beam fixedly secured at a point intermediate its ends to said plate means; a vertically disposed grid frame engaging beam slideably mounted on said support beam; latch means for progressively lowering said engaging beam in relation to said plate; and means for releasably mounting in stacked relation a multiplicity of grid frames on said engaging beam whereby said latch means may be activated to progressively lower said stacked frames into operating position on said plate.

7. The device of claim 6 wherein a bottom plate is releasably attached below each of the stacked grid frames whereby the plants in such frames may be retained therein until in operating position on said bearing plate.

8. The device of claim 7 wherein a spring loaded stacking means is provided below said bearing plate to accommodate the released bottom plates.

9. The device of claim 7 wherein the bottom plate attaching means is an impact-releasable latch means.

10. A transplanting device comprising a propelling means for moving the device over the ground; means for opening a furrow in the ground as the device is propelled thereover; a generally flat horizontally disposed bearing plate having at least one opening therein so located as to be disposed in vertical alignment with said furrow; a grid frame means slideably mounted on said plate and adapted to receive a multiplicity of plants; mechanical means for sliding said grid on said plate in at least two perpendicular directions in relation to said opening; and means to drive said mechanical means at a predetermined proportional speed to the speed the device is moving over the ground whereby plants placed in said grid may be progressively shifted over said opening and thereby planted in said furrow at predetermined intervals.

11. The device of claim 10 wherein auxiliary means is provided to increase the velocity of fall of said plants from said opening to said furrow.

12. The device of claim 11 wherein the means is a downwardly applied vacuum means.

13. A transplanting device comprising a multiplicity of horizontally disposed longitudinal and lateral frame members so connected to form a generally rectangular planter frame; at least one downwardly projecting support member fixedly secured at its upper end to the forward portion of said frame; at least one depth control wheel rotatively secured to the lower end of said support member; a longitudinally disposed furrow opener pivotably attached at its forward end to the lower portion of said support member rearwardly of said wheel; a vertically disposed plow support member releasably secured between the rear portion of said plow and said frame; a generally vertically disposed rear support member fixedly secured at its upper end to the rear portion of said frame; a pair of outwardly toed, outwardly cambered press wheels rotatively mounted on the lower end of said rear member, said wheels being so located that one passes on each side of the furrow cut by said opener; a generally flat bearing plate fixedly secured to the top of said frame; at least two spaced openings in said plate each of which defines a longitudinally disposed vertical plane which cuts the longitudinal axis of said plow; a plant receiving grid frame adapted to be slideably mounted on said plate; means for shifting said grid in at least two directions whereby each of the grid portions therein may progressively pass over said openings in the plate; and means for propelling said transplanter over the ground whereby plants may be dropped through the openings in said bearing plate into the furrow made by the opener and covered by the press wheels.

14. The device of claim 13 wherein a means is provided for positive feeding and accelerating the rate of fall of the plant between the bearing plate opening and the earth.

15. The device of claim 14 wherein the means is operated by a vacuum applied in a downward direction.

16. The device of claim 13 wherein the propelling means is a tractor.

17. The device of claim 13 wherein the outwardly toed, outwardly cambered wheels are set at an angle of approximately 45 degrees to the ground.

References Cited

UNITED STATES PATENTS

| | | | |
|---|---|---|---|
| 2,514,522 | 7/1950 | Shelton | 111—3 |
| 3,221,681 | 12/1965 | Snyder et al. | 111—3 |
| 3,306,239 | 2/1967 | Martin | 111—1 |
| 3,374,752 | 3/1968 | Shirozu | 111—2 |

FOREIGN PATENTS

| | | |
|---|---|---|
| 634,508 | 1/1962 | Canada. |
| 22,915 | 3/1962 | Germany. |
| 654,620 | 2/1935 | Germany. |

ROBERT E. BAGWILL, *Primary Examiner.*

U.S. Cl. X.R.

221—82